(12) United States Patent
McDaniel et al.

(10) Patent No.: US 8,730,233 B2
(45) Date of Patent: May 20, 2014

(54) MESH ESTIMATION OF TERRAIN

(75) Inventors: Michael S. McDaniel, Peoria, IL (US);
Andrea Cappalunga, Parma (IT);
Susmita Dutta, Waukesha, WI (US);
Alberto Broggi, Parma (IT); Stefano Cattani, Parma (IT)

(73) Assignee: Caterpillar Inc., Peoria, IL (US)

( * ) Notice: Subject to any disclaimer, the term of this patent is extended or adjusted under 35 U.S.C. 154(b) by 726 days.

(21) Appl. No.: 13/027,411

(22) Filed: Feb. 15, 2011

(65) Prior Publication Data

US 2011/0254833 A1  Oct. 20, 2011

Related U.S. Application Data

(60) Provisional application No. 61/325,503, filed on Apr. 19, 2010.

(51) Int. Cl.
*G06T 15/00* (2011.01)
*G06T 17/00* (2006.01)
*G09G 5/00* (2006.01)
*G06T 17/05* (2011.01)
*G06T 19/00* (2011.01)

(52) U.S. Cl.
CPC .................. *G06T 17/05* (2013.01); *G06T 15/00* (2013.01); *G06T 19/00* (2013.01)
USPC ........... 345/419; 345/420; 345/424; 345/621; 382/154

(58) Field of Classification Search
CPC ......... G06T 17/00; G06T 17/05; G06T 15/00; G06T 19/00
USPC .................... 345/419, 420, 424, 621; 382/154
See application file for complete search history.

(56) References Cited

U.S. PATENT DOCUMENTS

| 2009/0237398 | A1 | 9/2009 | Marshall et al. |
| 2010/0021052 | A1 | 1/2010 | Wellington et al. |
| 2010/0205219 | A1* | 8/2010 | Rousselle et al. ............. 707/797 |

OTHER PUBLICATIONS

Sebastian Thrun et. al., "Probabilistic Terrain Analysis for High-Speed Desert Driving," [online], (retrieved on May 5, 2010) Retrieved from the internet <https://www.asprs.org/publications/pers/2005journal/february/2005_feb_217-226.pdf>.

Aleksey Golovinskiy et. al., "Shape-based Recognition of 3D point Clouds in Urban Environments," [online], (retrieved on May 5, 2010) Retrieved from the internet <http://www.cs.princeton.edu/~funk/iccv09.pdf, http://www.roboticsproceedings.org/rss05/p19.pdf>.

Jonathan Schoenberg et. al., "Distributed Terrain Estimation Using a Mixture-Model Based Algorithm," [online], (retrieved on May 5, 2010) Retrieved from the internet < http://www.ri.cmu.edu/publication_view.html?pub_id=6414, http://robots.stanford.edu/papers/thrun.mapping-Stanley.pdf, http://asl.mae.cornell.edu/wiki/images/2/2d/2009_Schoenberg_FUSION_Distributed_Terrain_Mapping_Mixture_Model.pdf>.

Raia Hadsell et. al., "Accurate Rought Terrain Estimation with Space-Carving Kernels," [online], (retrieved on May 5, 2010) Retrieved from the internet <http://www.actapress.com/Abstract.aspx?paperId=33413 bstract.aspx?paperId=33413>.

\* cited by examiner

*Primary Examiner* — Jeffrey Chow
(74) *Attorney, Agent, or Firm* — L. Glenn Waterfield

(57) ABSTRACT

A method for generating a three dimensional grid of terrain includes receiving data representing a three-dimensional point cloud and generating a plurality of slices of the data. The method evaluates the slices using a swarm intelligence algorithm. The method is able to identify both terrain and objects. The terrain can also be identified as traversable terrain.

20 Claims, 13 Drawing Sheets

60

60

MESH ESTIMATION OF TERRAIN

RELATED APPLICATIONS

This application is based upon and claims the benefit of priority from U.S. Provisional Application No. 61/325,503 by Andrea Cappalunga et al., filed Apr. 19, 2010, the contents of which are expressly incorporated herein by reference.

TECHNICAL FIELD

The present disclosure relates generally to a method for generating a map, and more specifically to a method for generating a three-dimensional map of terrain.

BACKGROUND

Analysis of three-dimensional data sets in order to obtain terrain maps has been explored for some time. Processing the three-dimensional problem generally consumes a considerable amount of computing resources. Dividing the larger three-dimensional problem into smaller three-dimensional and two-dimensional problems, and applying swarm intelligence methods can provide efficiency improvements. The need also exists for identifying objects contained within the three-dimensional data set.

One example is disclosed by Raed Abu-zitar et. al., *"Application of ACO to the Terrain Generation in 3 Dimensional Continuous Search Space,"* which uses Ant Colony Optimization to generate artificial terrain. The generated terrain is used for computer graphics, games, simulations, and other similar applications. This work does not provide real-time analysis of actual three-dimensional data, nor does it identify objects in the three-dimensional data set.

SUMMARY OF THE DISCLOSURE

In one aspect of the disclosure, a method for generating a three dimensional grid of terrain is shown. The method includes receiving data representing a three-dimensional point cloud, generating a plurality of orthogonal slices of the data, evaluating the slices using a swarm intelligence algorithm, identifying terrain as a function of the evaluation, and generating a three-dimensional grid of the identified terrain.

In another aspect of the disclosure, a method for generating a three-dimensional map of traversable terrain is shown. The method includes the steps of receiving data representing a three-dimensional point cloud, generating a series of three-dimensional slices of the data, dividing each three-dimensional data slice into sub-slices, each associated with a two-dimensional reference plane, accumulating points normal to the two-dimensional reference plane into a series of two-dimensional planes, identifying a lowest cost path across each of the series of two-dimensional planes using a swarm intelligence algorithm, and merging the lowest cost paths to produce a three-dimensional grid of terrain.

In yet another aspect of the disclosure, a method for analyzing three-dimensional terrain using a two-dimensional algorithm is shown. The method includes the steps of receiving data representing a three-dimensional point cloud, generating a plurality of three-dimensional slices, each associated with a two-dimensional reference plane, and accumulating points normal to the two-dimensional reference plane into pixels of brightness proportional to the number of points accumulated, the pixel brightness indicating points of substantially equal elevation.

In yet another aspect of the disclosure, a computer-based system for generating a three-dimensional grid of terrain is shown. The system includes a receiving module for receiving data representing a three-dimensional point cloud, a slice generating module for generating a plurality of slices of the data, a swarm intelligence module for evaluating the slices using a swarm intelligence algorithm, a terrain identifying module for identifying terrain as a function of the evaluation, and a three-dimensional grid generating module for generating a three-dimensional grid of the identified terrain.

DETAILED DESCRIPTION

Figure 1:
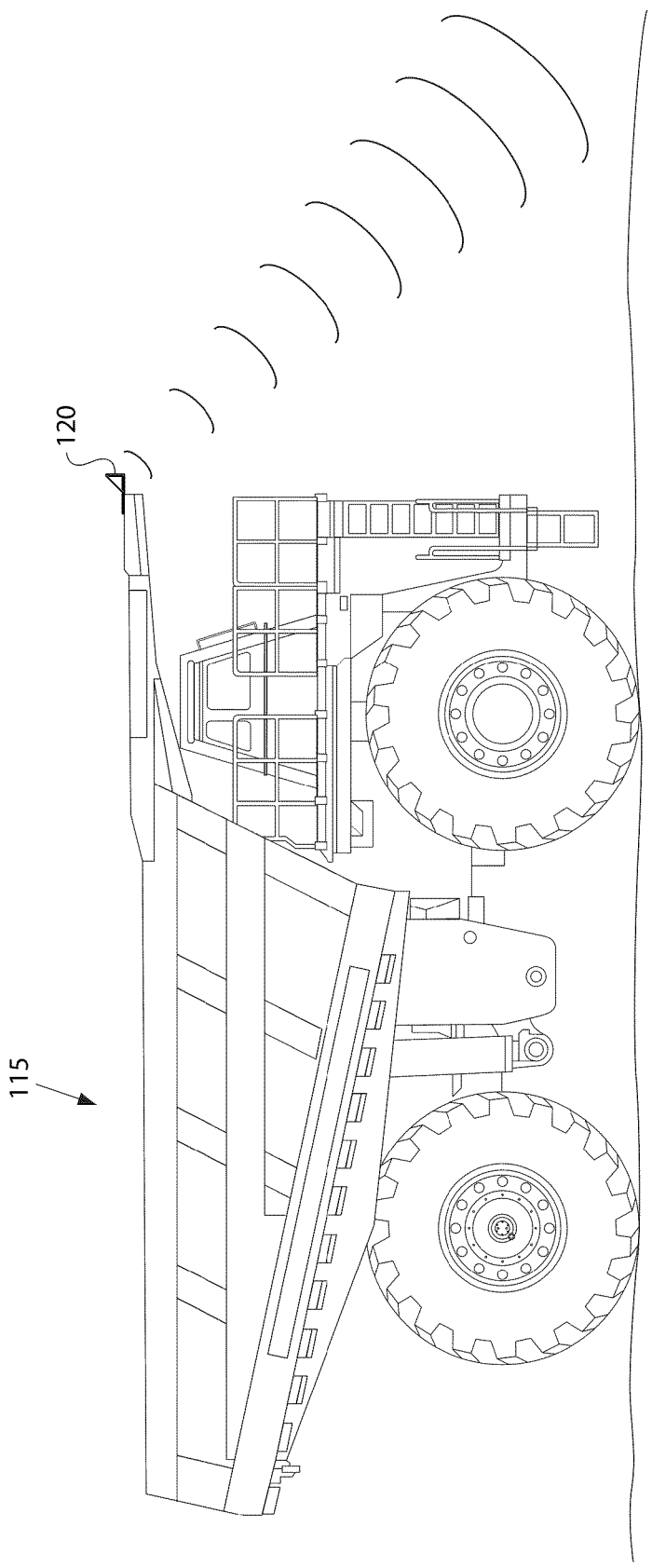
FIG. 1 shows a vehicle suitable for use with the present disclosure.

The current disclosed method involves processing 3D point cloud data 10 and providing an estimate of terrain 5. The 3D point cloud 10 may be obtained from a sensor 120 mounted on a vehicle 115. The sensor could use LIDAR, RADAR, stereo vision, or other well-known technology. The data could also be generated from a source other than a vehicle-mounted sensor, such as satellite data or surveying data.

The method described takes advantage of both local and global analysis and fitting. A set of two-dimensional (hereon referred to as 2D) orthogonal models replaces the three-dimensional (hereon referred to as 3D) global model. In one implementation, longitudinal 75 and lateral 80 models replace the 3D global model. Alternatively, radial and concentric models or another orthogonal model may be employed. This greatly reduces the computational complexity of the problem. Each of these models represents the projection of a 3D point lying of a world "slice" with a given width. The local terrain of these projections is estimated by applying a swarm intelligence algorithm (25). An example of a swarm intelligence algorithm is the Ant Colony Optimization algorithm (hereon referred to as ACO): this biologically inspired evolutionary algorithm identifies the optimal terrain as a shortest path problem, cutting out those 2D points that are not part of the terrain. The resulting longitudinal and lateral curves 35 and 40 will then be fused together to obtain a 3D Cartesian grid 45. Note that a polar system or other grid system could also be used.

Details about the ACO algorithm are provided below. Key aspects of the terrain definition are encoded into the ACO cost functions 30 and movement rules.

In some applications, terrain may be further classified as traversable if the surface is sufficiently smooth and horizontal to allow safe vehicle travel. Details how to define the ACO's cost function 30 and ant's movement rules on the basis of the maximum steepness allowed are provided below.

Algorithm Overview

The method can be described as a four step procedure:

1) 3D world points cloud: The algorithm needs a data set of 3D world points 10 $p_{x;y;z}$. The data set must provide enough points to support the desired resolution over the area of interest. Similar to other optimization algorithms, the ACO exploits the richness of the data set to avoid problems of local minima.

2) 2D projections: The world is divided into orthogonal slices. Longitudinal and lateral slices 15 and 20 of fixed width, height, and length are one representation. Each 3D point is projected onto its corresponding 2D reference planes 50 $P_i$ and 55 $P_j$ (longitudinal and lateral reference planes) to capture the profile associated with each slice. The profile includes all points in the slice whether they represent terrain 5, an object 100, or spurious noise. The dimensions of the slices are defined by the region of interest, the required resolution, and density of the original 3D point cloud 10. If a Cartesian representation with uniform slice width, w, is used, the resulting map has Cartesian cells of area w·w meters squared. Implementation details are shown in a later section. If a polar representation is used, the parameters would be expressed in terms of radius and degrees or radians.

3) 2D projections slope estimation: The goal is to extract from each 2D projection 75 and 80 the corresponding 2D longitudinal and lateral curves 35 and 40 representing the terrain.

4) 3D grid mapping: At this point a set of longitudinal and lateral terrain curves 35 and 40 are available, each one representing a limited portion of the region of interest. The orthogonal slices are then merged together at their intersecting points to produce a grid of the terrain as a set of (x; y) coordinates with their corresponding height z. Interpolating these points in the 3D grid map 45 then gives an estimate of the terrain throughout the region of interest.

Inliers and Outliers: As a side effect, each 3D point from the original point cloud can now be easily classified in the terrain as an inlier 60 or outlier 70. Inliers are considered terrain points while outliers are considered non-terrain points based on proximity to the appropriate curves 35 and 40. Non-terrain points may be further analyzed to define objects 100.

Two Dimensional Projections

Two-dimensional projections 75, 80 are grey scale images representing the Cartesian projection of the 3D-points belonging to a slice of the world (15, 20), onto their slicing plane 50, 55; so they are actually bi-dimensional views of several cross-sections of the world.

Figure 2:
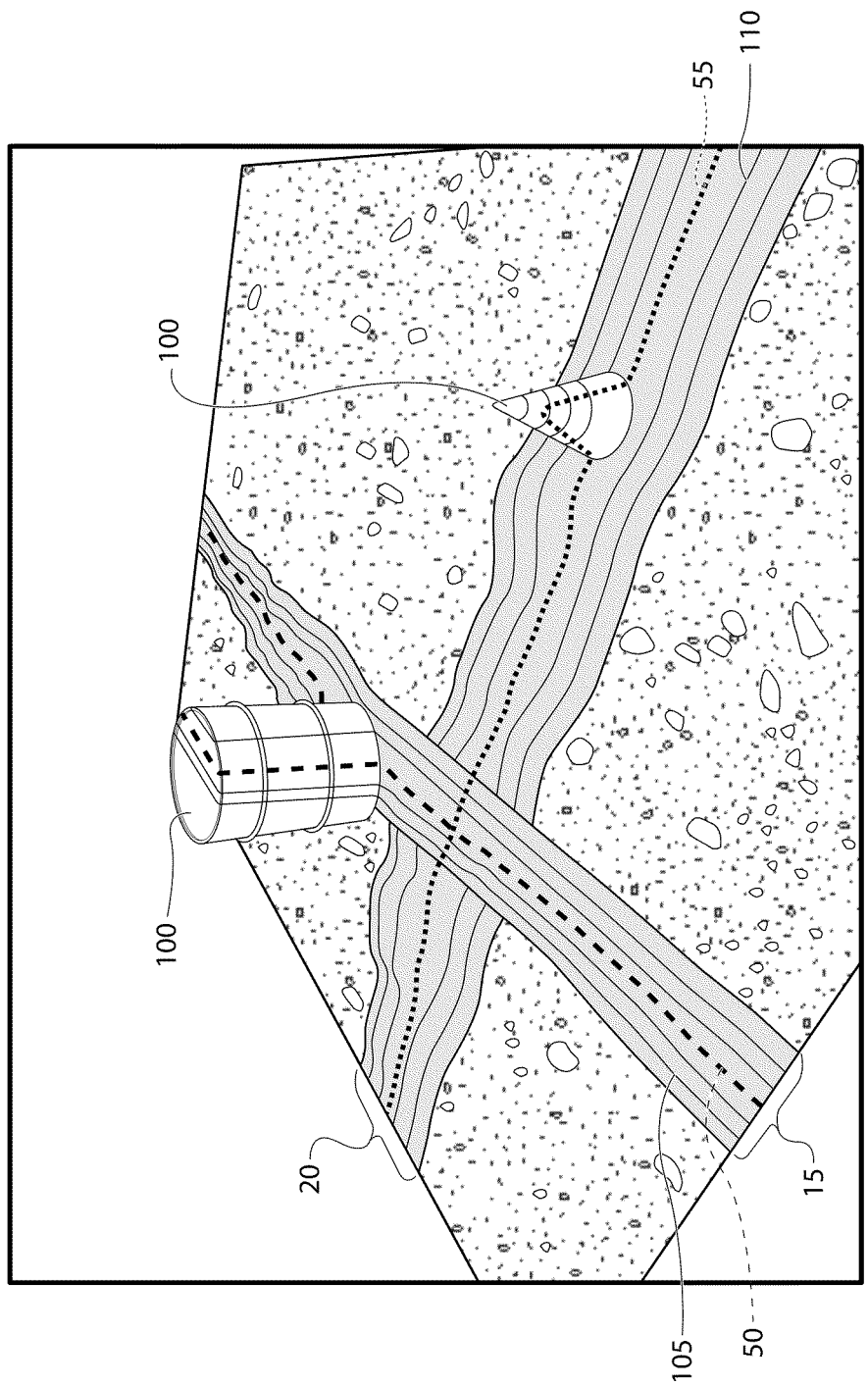
FIG. 2 shows a schematic illustration of terrain and objects using Cartesian slices.

FIG. 2 shows a typical scenario with terrain and objects that produce outliers, and gives an example on how the world is divided into orthogonal (in this case, Cartesian) slices. The region of interest is divided into M longitudinal and N lateral slices for a total of M*N views, longitudinal and lateral 75, 80 (the figure shows only one slice per dimension). The longitudinal and lateral data slices (15 and 20, shaded) are shown as well as the longitudinal and lateral 2D reference planes (50 and 55, dashed and dotted, respectively).

Figure 3:
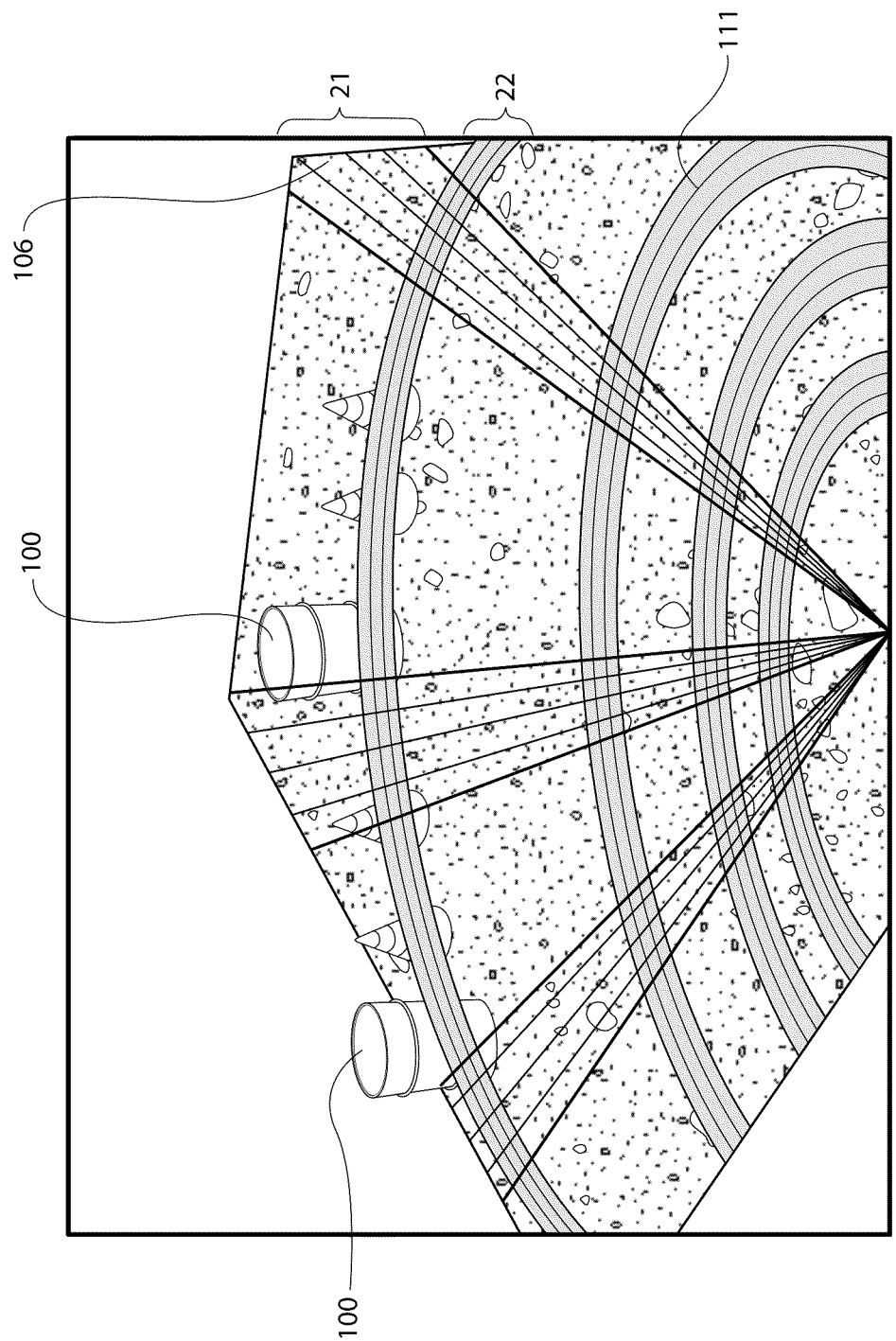
FIG. 3 shows a schematic illustration of terrain and objects using radial and concentric slices.

In addition to the Cartesian representation, a polar method could also be used. FIG. 3 shows a scenario wherein the world is divided into radial and concentric slices 21 and 22. The data is then processed in substantially the same way as the Cartesian representation.

Figure 4A:
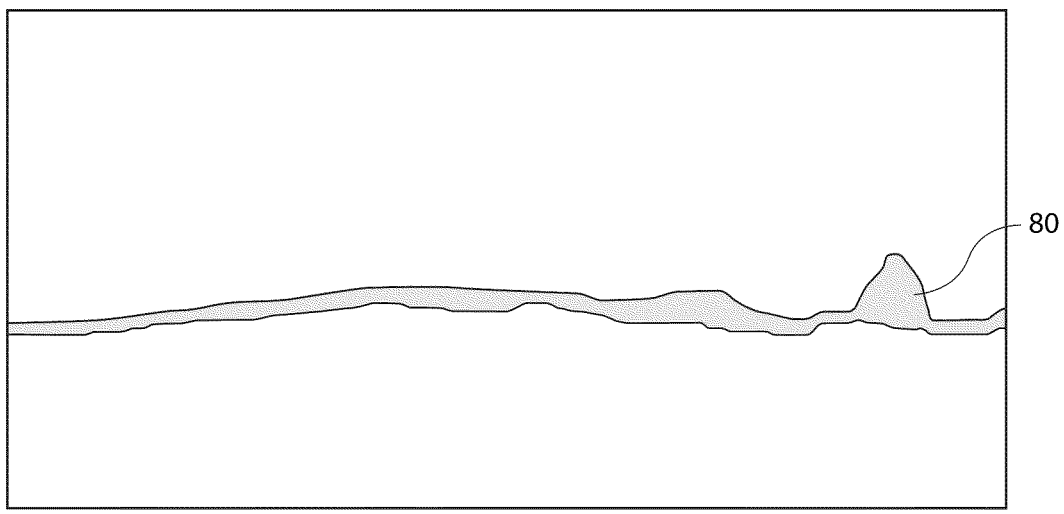
FIG. 4a shows an illustration of a two-dimensional lateral projection.
Figure 4B:
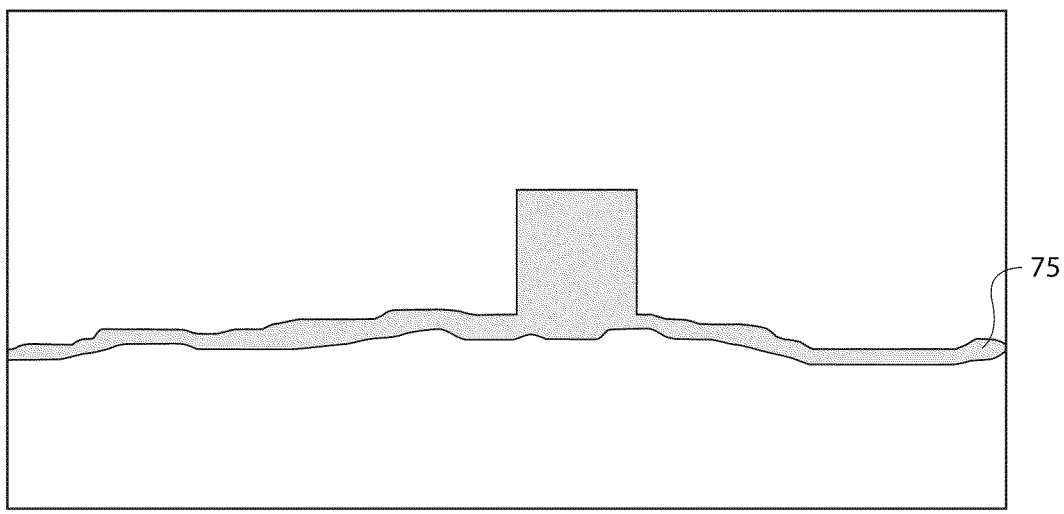
FIG. 4b shows an illustration of a two-dimensional longitudinal projection.

To better illustrate the method, imagine that all 3D points in the shaded slices collapse onto the planes 50, 55 identified by their respective dashed or dotted trace; the result of the operation is shown in FIG. 4a and FIG. 4b. In this case, the shape of the non-terrain features appears clearly in the projected images in the lateral projection 80 FIG. 4a a triangle on the right side represents the cone, while in longitudinal projection 75 shown in FIG. 4b the rectangle corresponds to the barrel. All other projections are created in the same way, i.e. by projecting the points belonging to their slice on planes parallel to the dotted one for lateral projections and on planes parallel to the dashed one for longitudinal projections.

Greyscale

The output example shown in FIG. 4 is black and white rather than greyscale to better illustrate the projections creation; in practice these images are created as grayscale images, in order to improve the performance of the profile extraction step executed on the images. The pixels in these images are "accumulators" that count the number of 3D points present in their relative area. The accumulation can be done by a number of mathematical functions, such as addition or averaging. The pixels with a higher accumulated value will be "brighter" and of higher interest during the ACO process. This value will be referred to as pixel brightness 85.

Realtime

The impact of the realtime constraint of this method is determined by two parameters: number of projections and resolution of projections. It is important to highlight that this step implies the processing of M*N images at each execution loop, so it is necessary to tune both parameters in order to find a good tradeoff between, computational time, output accuracy, and point cloud density according to the available processing hardware. In practice, multicore CPU technologies allow highly parallel processing of the independent 2D image creation and profile extraction calculations.

The method allows analysis of the world as a grid, and splits the problem of terrain estimation into the analysis of several ground profiles, one for each projection 75, 80; after that, it will be possible to fuse all the information extracted from each 2D projection image, without losing information of the globality of the terrain in any step.

Estimating Slope of the Projections

Once the 2D projections 75, 80 are ready, it is possible to analyze those images and extract a terrain approximation at every projection. Several methods can be used for extracting ground profiles from the projection images, including swarm intelligence algorithms. Any of the known swarm intelligence algorithms could be used. This disclosure will focus on Ant Colony Optimization. This method uses a distributed metaheuristic for combinatorial optimization problems, inspired by the communication system of biological ants. Experimental observations show that a colony of real ants, after a transitory phase, always finds the shortest path from the nest to the food. This is achieved by depositing pheromone, an odorous substance, on the terrain to attract following ants. Arriving at a decision point, ants make a probabilistic choice based on the amount of pheromone they smell in correspondence to all the possible roads. Due to this autocatalytic process, the shortest path (the one covered in fewest steps) emerges as the one with the largest amount of pheromone. Returning to the terrain estimation problem, the goal becomes that of building one ant colony for each 2D projection (75, 80), moving pixel by pixel, and finding the optimal slope curve for each projection.

The ACO Approach

A brief summary of ACO mathematical entities is shown below.
1) A finite set $\Lambda$ of connections $\lambda_{ij}$ among components $x_i$ and $y_j$ in X.
2) A cost function $\Gamma(\lambda_{ij}, t)$ with which assigns to each $\lambda_{ij}$ its own cost value, defined as $\Gamma_{\lambda_{ij}} \equiv \Gamma(\lambda_{ij}, t)$ where t is a time measure.
3) A finite set of $\Omega(X, \Lambda, t)$ of constrains between X and $\Lambda$ elements
4) A set $\Sigma$ of states defined as variable length sequences of components $\sigma = \langle x_i, x_j, \ldots, x_k \ldots \rangle$
5) A set $\Sigma(t) \in \Sigma$ if feasible states, defined by $\Omega(X, \Lambda, t)$
6) A state $\sigma_1$ is a feasible neighbor of the state $\sigma_2$ if i) both $\sigma_1$ and $\sigma_2$ are in $\Sigma(t)$, ii) $\sigma_1$ can be reached from $\sigma_2$ in one single step; since $x_i$ is the last element of the $\sigma_2$ sequence, $\sigma_1$ is a neighbor of $\sigma_2$ if $\exists x_j \in X: \exists \lambda_{ij} \in \Lambda$ and $\sigma_1 = \langle \sigma_2, x_j \rangle$. The set of feasible neighbors of $\sigma$ is called $N_\sigma(t)$.
7) A solution $\psi$ is an element of $\Sigma(t)$ that meets some exit condition e.
8) An objective cost function $\Gamma_\psi$ which assigns a cost value to each solution reached.

The ACO algorithms are implemented by building a colony of artificial ants that tries to approximate the optimal solution of a shortest path problem in the following way:

Each ant starts from its own starting state and moves through one of its own feasible neighbors, thus building a solution step by step. The process ends when the ant reaches its own exit condition (i.e. final state).

Often a heuristic function is supplied, to indicate the convenience of moving from a state to another, based on a priori knowledge of the application.

Each connection has an associated pheromone trail encoding the experience of the previous ants: the higher the pheromone deposit, the lower the costs of previous ants' solutions that included the connection.

Each ant moves towards states of its own feasible neighbors applying a probabilistic rule. The probabilistic rule is a function of: (i) the heuristic function; (ii) the pheromone trail; (iii) the information yield by the ant during its past travel to the current state.

Once an ant has reached the exit condition it increases the quantity of pheromone on its path in a way inversely proportional to the cost of the solution it constructed. This is a reinforcement learning strategy that modifies the way the following ants will perceive the problem, thus performing a distributed adaptive approach.

Implementation

Hence, the problem of finding an optimal projection terrain estimation must be formalized in terms of shortest path problem through a graph, where each solution is represented by a path satisfying the constraints and meeting some exit condition. In particular we have:

graph's nodes corresponds to projection's pixels; so ants move from pixel to pixel;

the starting nodes are located on the left bound of the projection image;

the exit nodes are located on the right bound of the projection image;

the heuristic functions correlate attraction to a pixel with pixel brightness;

the cost function will be computed, again, on the basis of the projection's pixels values with brighter pixels assigned lower costs;

ants move from one pixel to another governed by a set of motion rules and constraints.

Focusing on motion rules and constraints, the rules determine the ants' ability to follow only a given range of slopes' crest steepness. Hence, they implicitly define what is terrain and what is not. When an ant faces a slope too steep for its motion ability, it will inevitably cut it off. Since there is a direct mapping between the projection's pixels and 3D world points, defining the maximum and minimum bounds of steepness for the pixels slopes, automatically sets the corresponding 3D world points slope's steepness limits for the mapped terrain.

According to the definition of projection images 75, 80 given earlier, each row always represents a given height z in the world reference system, while columns represent a given x or y distance, respectively for longitudinal and lateral projections 75, and 80. Regardless of the particular orientation, the aim of the ant colony is to find a mapping (i.e. function) from each column to the corresponding row, represented as a sequence (i.e. path) of (x or y; z) points. These paths define the projection curves 35 and 40. Hence, each ant has to move, on the image, from left to right, trying to connect the starting leftmost pixel with the final rightmost one, while overlapping projections of 3D points.

Figure 6A:
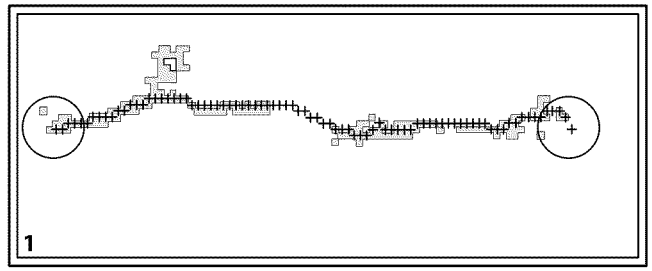
FIG. 6 is a diagrammatic illustration of ant colony paths for the numbered projections of the slices in FIG. 4.
Figure 6B:
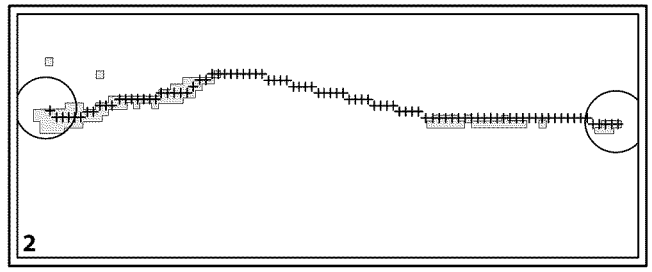
Figure 6C:
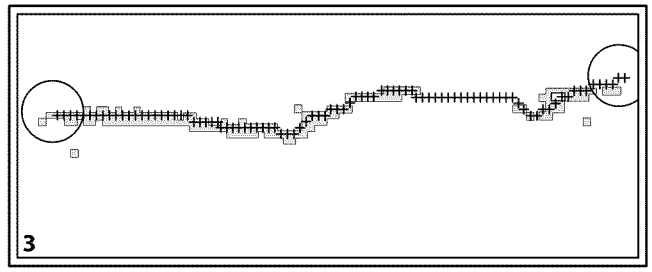
Figure 6D:
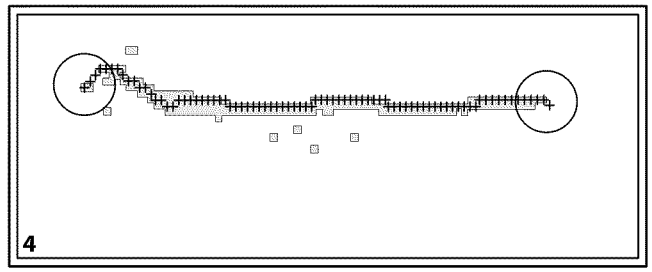
Figure 6E:
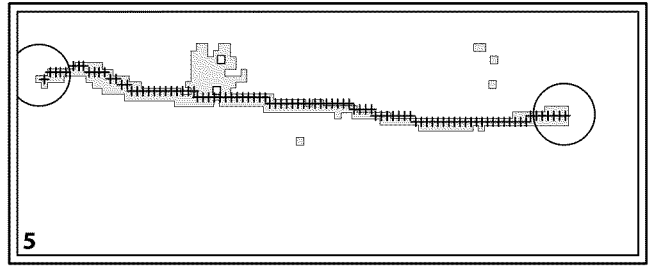
Figure 6F:
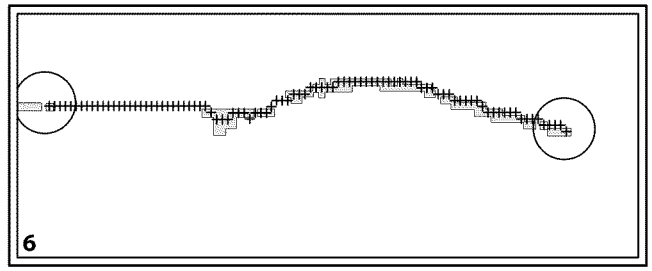

It can so happen that columns may be blank, due to lack of 3D points in those regions. For sensor-based data sets, objects or terrain may occlude the sensor resulting in a lack of 3D points. This is evident in FIGS. 6*a-c* where either the barrel or the crest of the small hill prevent the sensors from obtaining data immediately behind the object or feature. For this reason the starting pixels are chosen, projection by projection, by pixel histograms, using which it is possible to approximate the location of the first projected non blank pixel. A random walk process is used, if needed, to fill the gaps between the rightmost non blank pixel in the projection and later columns in the image. The combination of a random-walk process and the pheromone attraction produces minimum-cost solutions in regions where no data is available. In FIG. 6 the starting areas are located around the left circles, while the right circle marks the last best valid pixel before the random-walk tail to the exit point. FIGS. 6*a-c* show the numbered longitudinal slices, while FIGS. 6*d-f* show the numbered lateral slices. The plus "+" symbols show the longitudinal and lateral curves 35 and 40 that represent the lowest cost path across the 2D image.

Motion Rules

Figure 7:
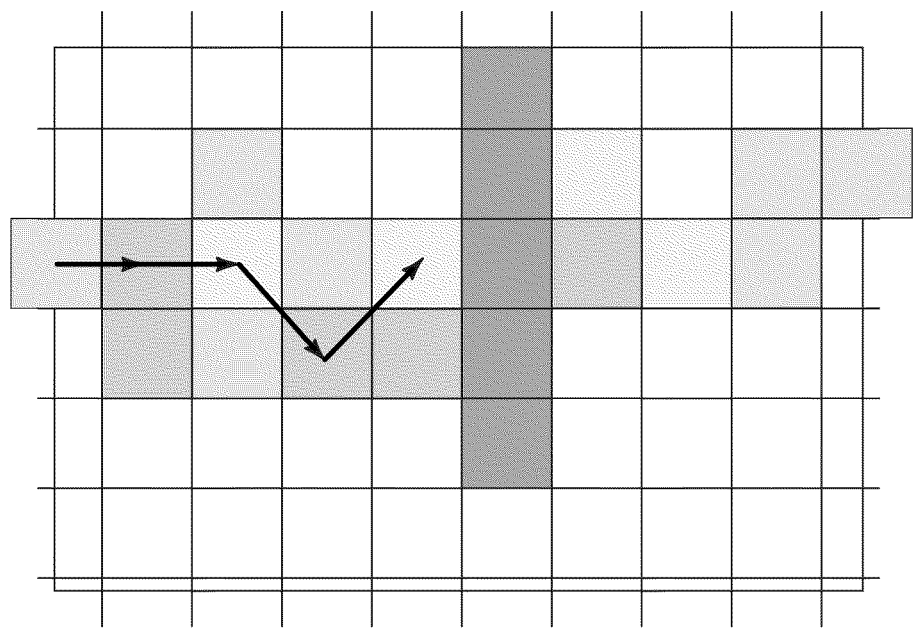
FIG. 7 shows an example of an ant's path.

At each step, ants move from pixel to pixel. In particular, each ant can move from the current pixel to a limited subset of the neighboring (moving left to right) column's pixels (see FIG. 7). The darkest pixels indicate the current set of neighbor pixels in the next column. By varying the subset size it is possible to bound the ants' motion ability. How ants choose the next pixel is determined by these motion rules, which can be divided into two levels. The first one makes the ants attracted to those pixels which have the highest brightness and/or highest pheromone levels, which is typically called random-proportional. Recalling how the projection images are built, high levels of brightness correspond to a high number of 3D points accumulating on the pixel. 3D points on uniform terrain tend to accumulate on the same pixel, generating higher brightness than the non-terrain points, thus making them more attractive. The previous ants' experience comes into the moving rule as well, in the form of the pheromone trails it leaves behind.

The random-proportional rule may be described as follows:

$$a_{x_k} = \frac{(\alpha) \cdot \tau_{hk}(t) + (1-\alpha) \cdot \eta_{hk}}{\sum_{x_l \in \overline{N}_{\sigma_h}} (\alpha) \cdot \tau_{hl}(t) + (1-\alpha) \cdot \eta_{hl}} \text{ if } x_k \in \overline{N}_{\sigma_h} \quad \text{(Eq. 1)}$$

$$a_{x_k} = 0 \text{ otherwise} \quad \text{(Eq. 2)}$$

Where:
$\sigma_h$ is the current state
$a_{x_k}$ is the probability of state $<\sigma_h, x_k>$ of being the next state
$\overline{N}_{\sigma_k} = N_{\sigma_k} \cap \{(r, j+1), r \in N\}$ are the neighbors on the next column j+1
$\alpha$ is a parameter with which it is possible to tune the balance between edge-exploitation and pheromone-exploitation behavior of the ants The second level consists of the so-called pseudorandom-proportional rule, using which it is possible to improve the exploitation behavior of the ants. This rule reviews the previous choice made with random-proportional, thus giving new chances to pixels with higher brightness. This is particularly useful in the final iterations, where the pheromone deposit is very strong. The destination pixel is chosen from among the same neighborhood set, made of the next column's subset pixels.

The pseudorandom-proportional rule may be described as follows:

$$x_{next} = x_j : \eta_{x_k} = \max_{x_l \in N_{\sigma_h}} (\eta_{x_l}) \quad \text{if } q \leq q_0 \quad \text{(Eq. 3)}$$

$$x_{next} = x_k \text{ random based on Eq. 1 otherwise} \quad \text{(Eq. 4)}$$

Where q is a random variable with a uniform probability distribution, and $q_0$ is a threshold defined as follows:

$$q_0 = \gamma \cdot \frac{\max_{x_l \in N_{\sigma_h}} (\eta_{x_l} - \eta_{x_{next}})}{\max_{x_l \in N_{\sigma_h}} (\eta_{x_l})} \quad \text{(Eq. 5)}$$

Parameter $\gamma$ is used to vary the balance between global exploitation and exploration behavior.

Cost function 30, pheromone update and pheromone evaporation: once the ants reach one of the final pixels, each ant has to evaluate its own path by the cost function: the higher the traversed pixels' brightness, the lower the cost. So the path cost is inversely proportional to the average brightness accumulated over the collection of its pixels. A path formed by bright pixels costs less than a path formed by dim pixels. On the basis of the value, each ant updates the pheromone deposit 95 along its path, the lower the path's cost, the higher the ant's contribution.

The cost function 30 may be described as follows:

$$L_k = \frac{\sum_{ij \in path_k} (255 - edge_{ij})}{pathlength} \quad \text{(Eq. 6)}$$

The pheromone deposit 95 is described as follows:

If (k-ant passed from pixel i to j) then $\Delta_{ij}^k = \frac{Q}{(L_k - L_{k-best})} \quad \text{(Eq. 7)}$ Otherwise $\Delta_{ij}^k = 0 \quad \text{(Eq. 8)}$ Where Q is a fixed parameter and $L_{k-best}$ is the cost of the current best solution. The pheromone update rule may be described as follows:

$$\tau_{ji}(t+1) = (1-\rho) \cdot \tau_{(ji)}(t) + \rho \cdot \sum_{k=1}^{N_{ox}} \Delta_{ij}^k(t) \quad \text{(Eq. 9)}$$

Where t is a time measure representing the evolution of the pheromone deposit and $\rho \in (0,1)$ is the pheromone evaporation ratio.

With time, the previously deposited pheromone 95 evaporates at a given rate, in this way early paths no longer covered by recent ants will be penalized and eventually forgotten, while giving more weight to those paths (and deposits) reconfirmed and reinforced by subsequent ants.

Figure 5:
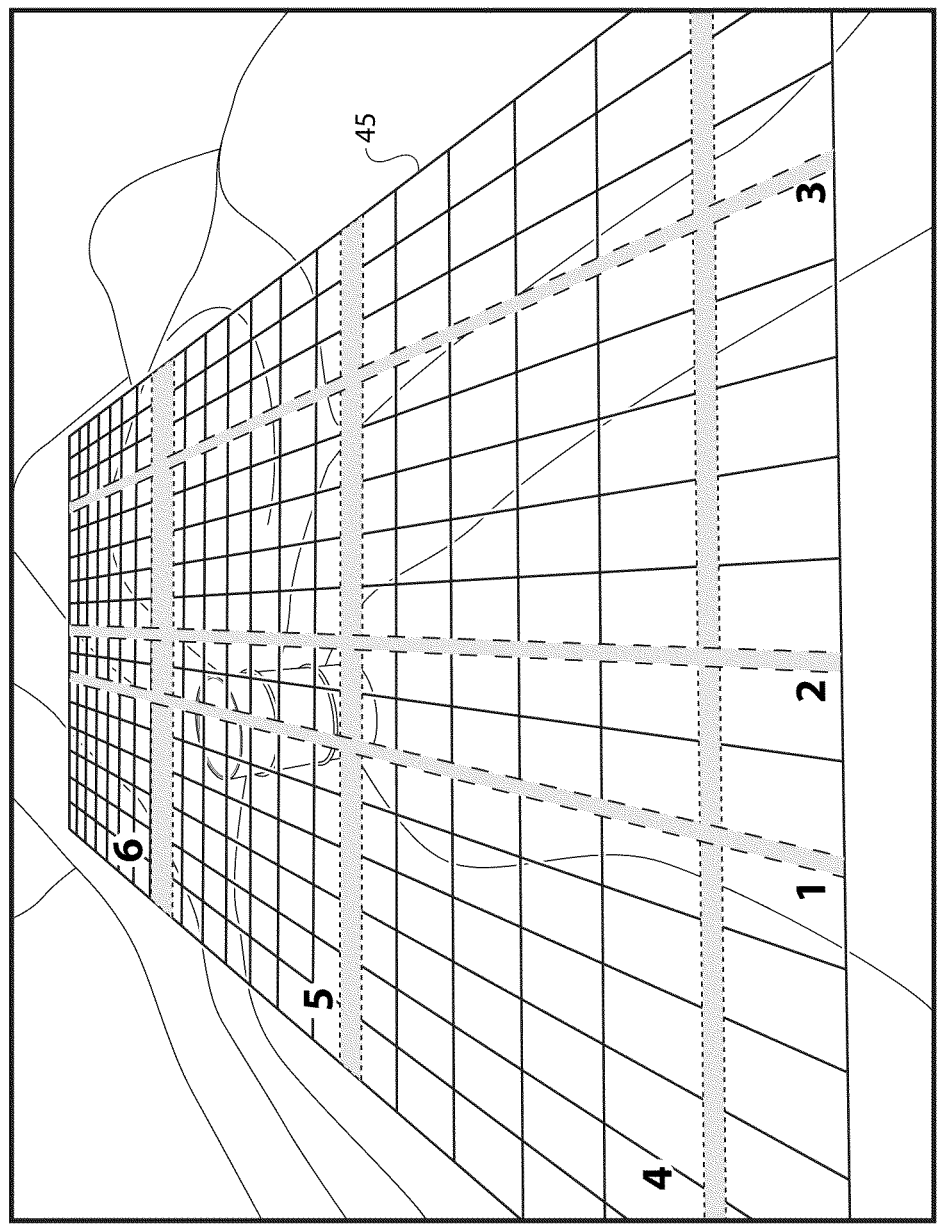
FIG. 5 is a diagrammatic illustration of a terrain with numbered longitudinal and lateral projections.

FIG. 5 shows an example of terrain with highlighted longitudinal and lateral projections analyzed. Three longitudinal slices, numbered 1, 2, and 3 are shown in dashed lines. Three lateral slices, numbered 4, 5, and 6 are shown in dotted lines.

The projections numbered in FIG. 5 are shown individually in FIGS. 6a-6f. Note how the outliers in 6a and 6e are cut off by the ACO algorithm. Note also how in 6a, 6b, 6c, and 6f how the ants are able to deal with missing terrain points, linking unconnected parts of the terrain.

In summary, a colony of intelligent ants is created for each projection. As ants try to find the best path connecting starting pixels to the final pixels, adopting a collaborative behavior, the best path on each projection emerges as the optimal slope estimation. FIG. 6 shows this process.

Terrain Mapping

The output of the ACO algorithm is a list of points representing the corresponding projection's terrain. The points are further simplified with a polyline prior to fusion resulting in the final slice profiles.

Figure 8:
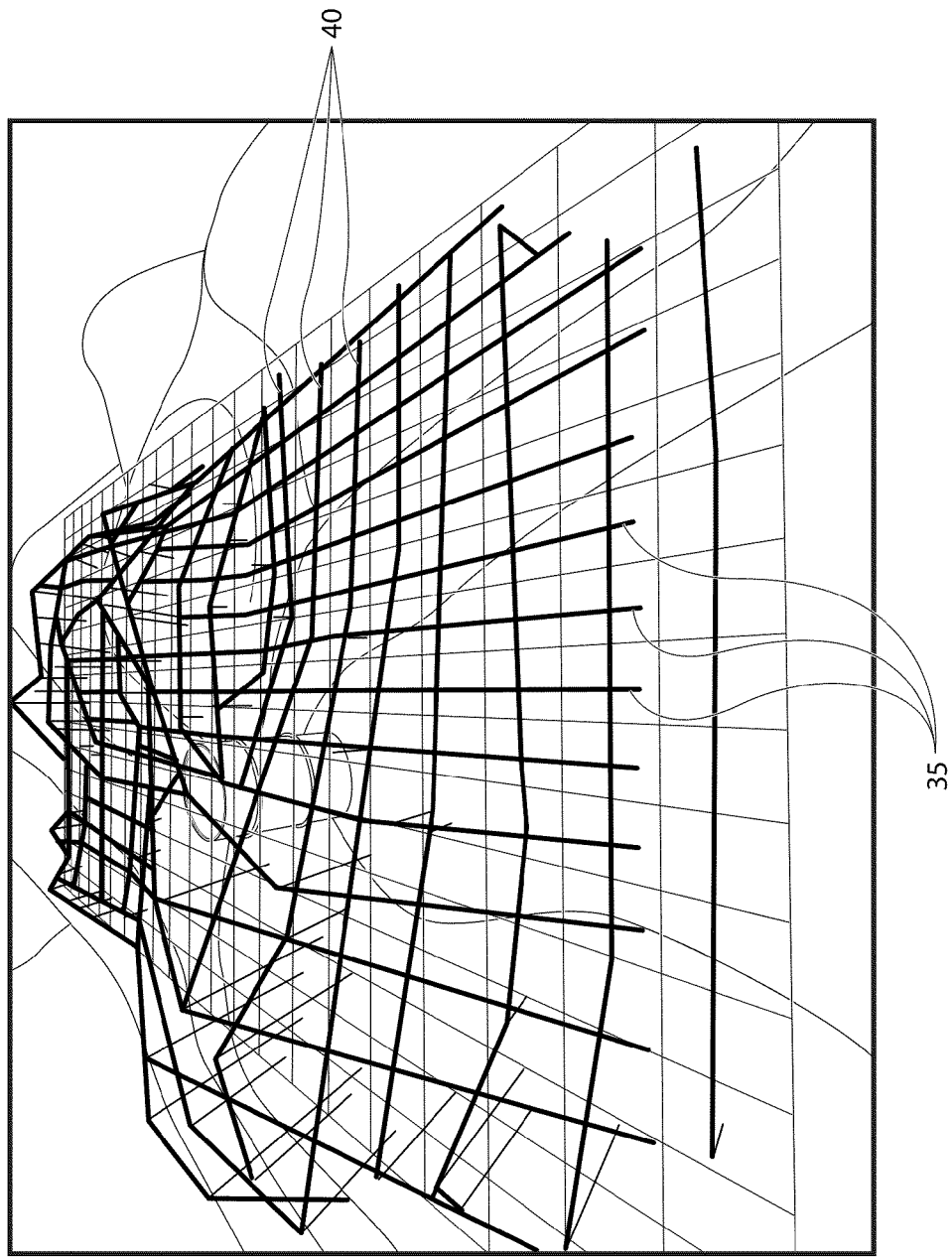
FIG. 8 shows an example of output curves.

FIG. 8 shows an output of the ground profile extraction from each slice 15, 20 which are not yet usable since they precede the fusion step that merges the results of both sets into a single terrain model for the region of interest. This fusion is done by fixing a grid of points (x; y; 0:0) in the world, and evaluating their relative existing profiles (if present) in order to determine the surface z value for each point. If both profiles are present for that point, the z coordinate is set to the average value of the two. If only one is present z will coincide with the polyline value at the current (x; y). If no profiles cover the current point, the location (x; y) is marked as "unknown" and the corresponding height remains to its default value z=0. In one implementation, the output of this fusion is a model that can be queried at each (x; y) of the continuous world of the region of interest, to retrieve the z value at that point. This is done by bilinear interpolation of computed points. Interpolation may assign different importance to results in one dimension over another dimension based on application or the expected reliability of the data.

Figure 9A:
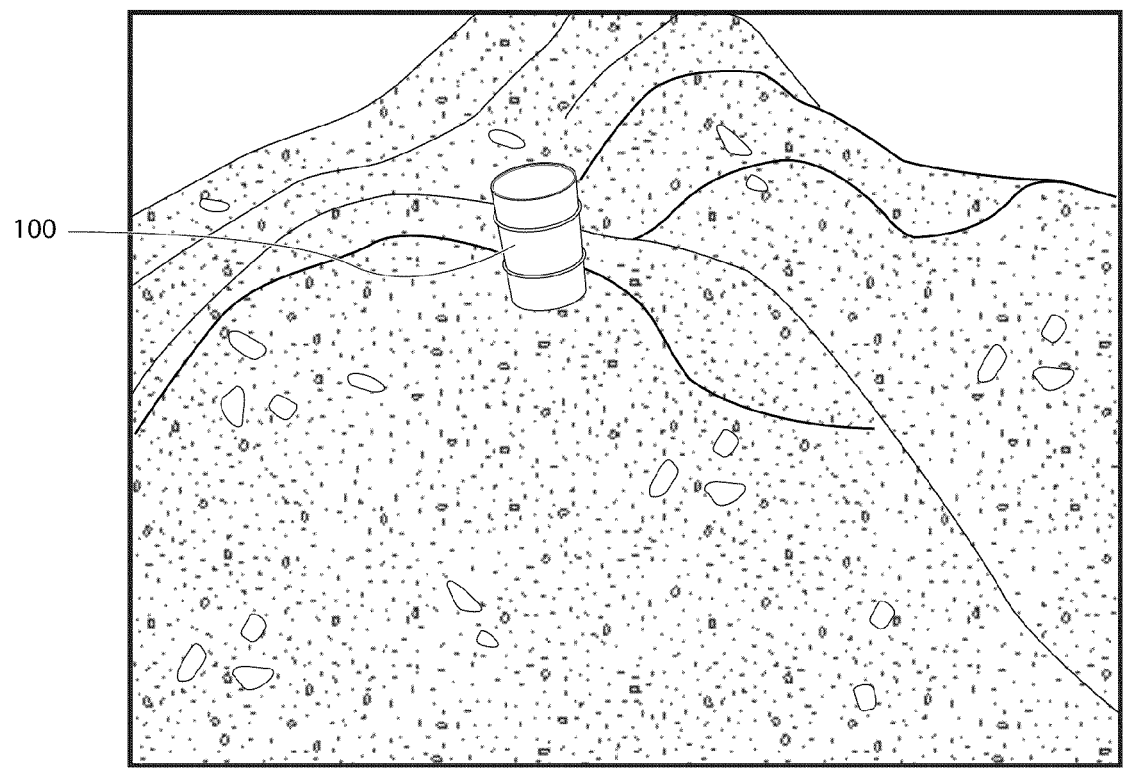
FIG. 9a shows an example of terrain with an object
Figure 9B:
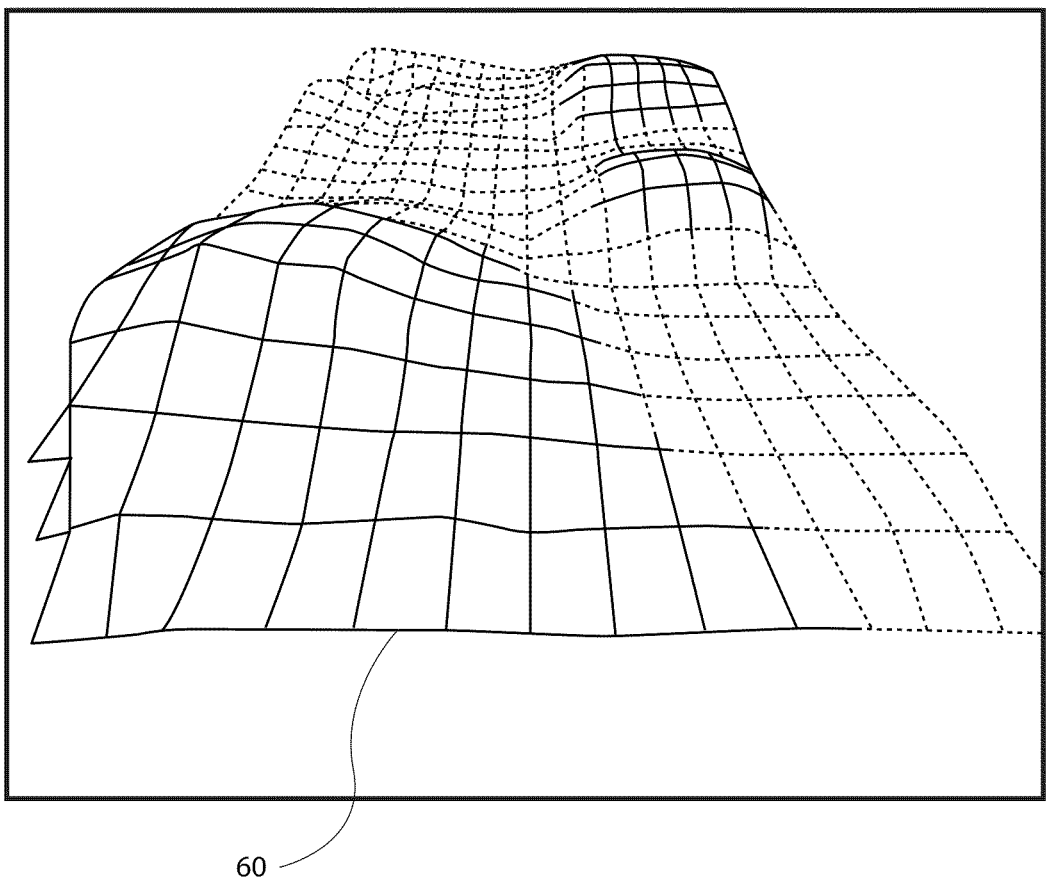
FIG. 9b shows an example of the resulting terrain mapping
Figure 9C:
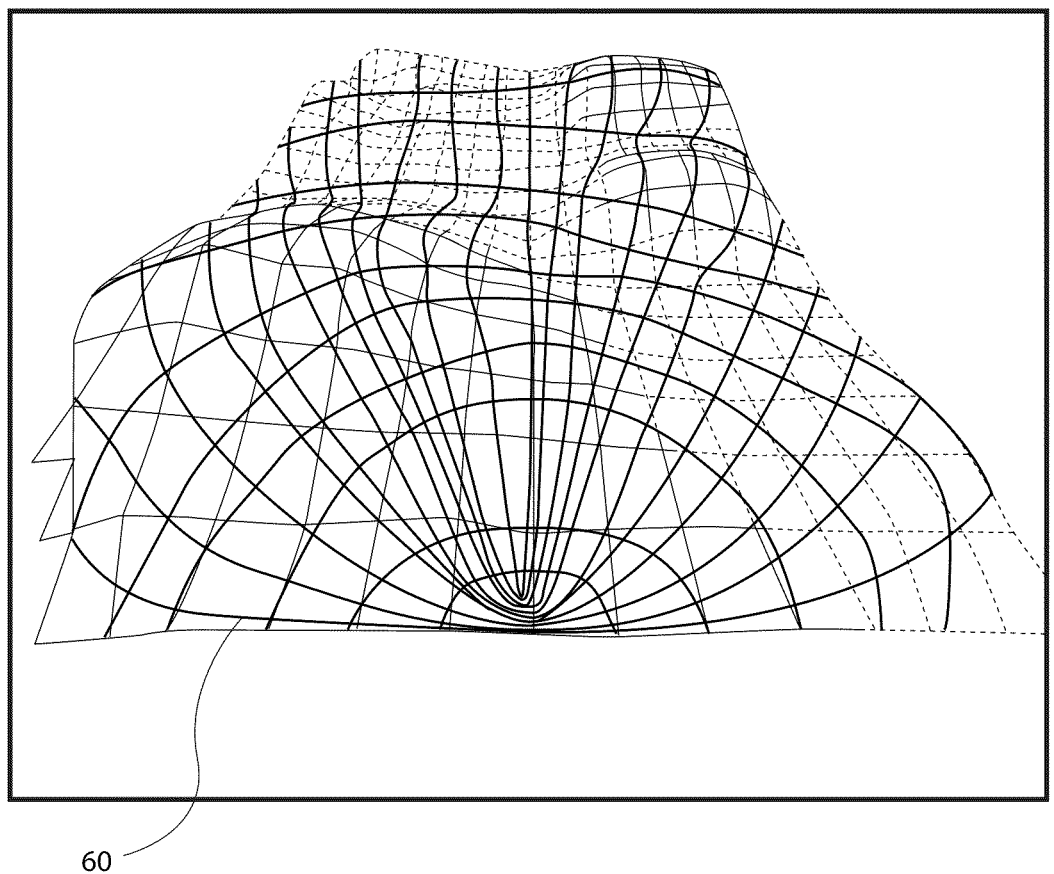
FIG. 9c shows another example of the resulting terrain mapping
Figure 10:
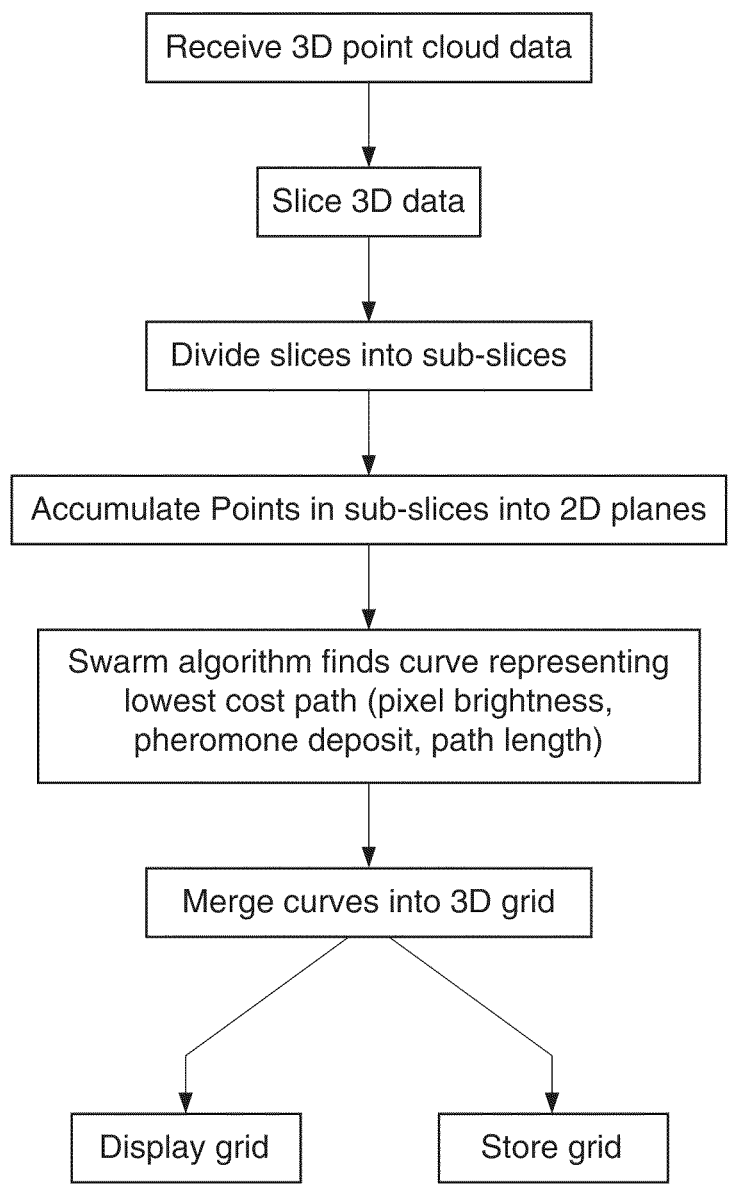
FIG. 10 shows a block diagram.
Figure 11:
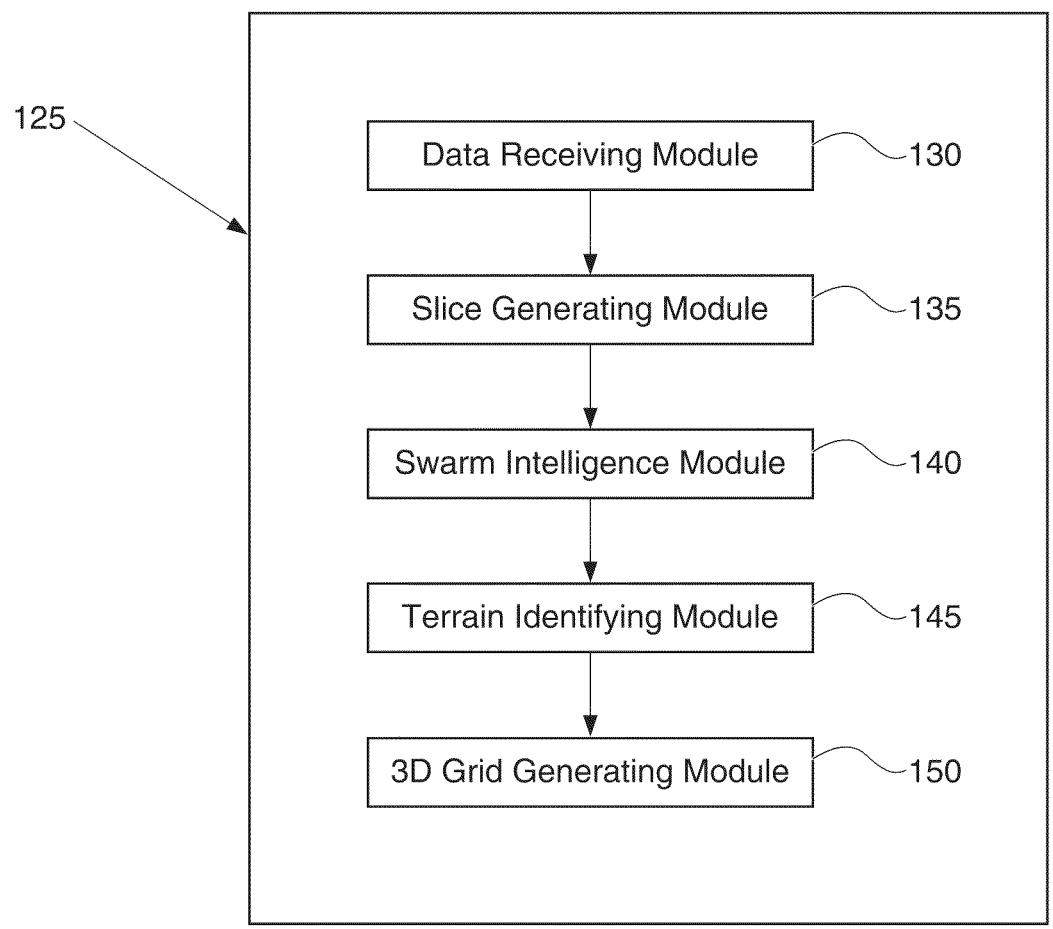
FIG. 11 shows modules of a computer-based system.

FIG. 9 shows an example of the output of the system, with terrain mapping and outlier segmentation. A Cartesian version of the output terrain grid 60 is shown in FIG. 9b. A polar version is shown in FIG. 9c. The terrain that was analyzed is shown in FIG. 9a. Notice how the output in FIG. 9b or 9c does not include the object 100 shown in 9a. The object can be stored or displayed separately if desired. The output shown in FIG. 9b or 9c can be displayed to an operator via a display 155. The output shown in FIG. 9b or 9c can also be stored in an electronic memory device 160 for use by another system.

INDUSTRIAL APPLICABILITY

An example of a use of the method may be object detection for human-operated, autonomous, or semi-autonomous machines. The terrain estimate process uses inlier terrain points 65 to define terrain. The outlier terrain points 70 therefore identify non-terrain. Non-terrain points may be the result of sensor noise or a plurality of objects 100. The location of the objects 100 would be identified to the machine or machine operator. The machine or machine operator would then take an action based on the objects 100 and their location. The objects 100 could be obstacles to be avoided during machine operation. The objects 100 could also be targeted by the machine or machine operator. For instance, the objects 100 could be items or material for the machine to move, or an object to be manipulated. The object 100 could also be designated as a target to be engaged or destroyed.

Another example of the use of the method may be terrain estimation for an autonomous or semi-autonomous machine. Such machines need to estimate traversability and associated cost functions. A coarse estimate of the terrain can be used for inclination or grade. Fine estimates can be used to avoid puddles and loose material. Human operators employ feed-forward techniques to optimize one or more elements (such as comfort, energy, or time) of travel. Similar techniques may be useful for autonomous machines and applying this capability for semi-autonomous machines can help with training/optimization where less skilled operators are responsible for machine controls. As an example, a terrain estimate may trigger increased fuel flow immediately before the blade engages rather than have the engine lug in response to the increased load. As another example, a terrain estimate indicating a washboard road can be used to improve ride comfort and reduce material spillage.

Still another use of the method may be to measure material in a bucket or bowl (such as a wheel tractor scraper bowl). It can also be used to estimate the volume of material in a stockpile or to help an operator manage loads within a machine.

Yet another use of the method may be to identify specific features in the environment represented by the three-dimensional data set. Mines often place material (known as berms) along the sides of haul roads and at dump sites. Terrain estimates can be used to estimate the displacement of a machine relative to these berms.

Other uses of the method may be to estimate progress towards finished contours, or to allow on-the-fly surveying. The terrain estimate can be used to plan material requirements and scheduling delivery to minimize re-handling. This can be especially useful for estimating gravel requirements to backfill around a buried pipe since the trench is an irregular shape. The terrain estimate can be used to estimate volumetric compaction (soil, landfill, paving compactors). In all cases, the output of the terrain estimate may be used immediately or stored for later use.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A method for generating a three dimensional grid of terrain, comprising the steps:
   receiving data representing a three-dimensional point cloud;
   generating a plurality of slices of the data;
   evaluating the slices using a swarm intelligence algorithm;
   identifying terrain as a function of the evaluation; and
   generating a three-dimensional grid of the identified terrain.

2. The method of claim 1 further comprising the step of displaying the identified terrain.

3. The method of claim 1 further comprising the step of storing the identified terrain in a memory device.

4. The method of claim 1 wherein the identified terrain is identified as traversable terrain.

5. The method of claim 4 further including the steps of:
   identifying at least a portion of the terrain as non-traversable terrain; and
   defining the non-traversable terrain as at least one object.

6. The method of claim 1 wherein the plurality of slices are longitudinal and lateral slices.

7. The method of claim 1 wherein the plurality of slices are radial and concentric slices.

8. The method of claim 1 wherein the swarm intelligence algorithm compensates for missing terrain data.

9. The method of claim 1 further comprising the step of:
   accumulating points normal to the two-dimensional reference plane into pixels of brightness proportional to the number of points accumulated, the pixel brightness indicating terrain of substantially equal elevation.

10. A method for generating a three dimensional map of terrain, comprising the steps:
    receiving data representing a three dimensional point cloud;
    generating a series of three-dimensional slices of the data;
    accumulating points normal to two-dimensional reference planes into a series of two-dimensional planes;
    identifying a lowest cost path across each of the series of the two-dimensional planes using a swarm intelligence algorithm; and
    merging the lowest cost paths to produce a three-dimensional grid of terrain.

11. The method of claim 10 further comprising the step of displaying the identified terrain.

12. The method of claim 10 further comprising the step of storing the identified terrain in a memory device.

13. The method of claim 10 wherein the identified terrain is identified as traversable terrain.

14. The method of claim 13 further including the steps of:
identifying at least a portion of the terrain as non-traversable terrain; and
defining the non-traversable terrain as at least one object.

15. The method of claim 10 wherein the plurality of slices are longitudinal and lateral slices.

16. The method of claim 9 wherein the plurality of slices are radial and concentric slices.

17. The method of claim 9 wherein the swarm intelligence algorithm defines missing terrain data.

18. The method of claim 10 further comprising the step of:
accumulating points normal to the two-dimensional reference plane into pixels of brightness proportional to the number of points accumulated, the pixel brightness indicating terrain of substantially equal elevation.

19. A method for analyzing three-dimensional terrain using a two-dimensional algorithm, comprising the steps:
receiving data representing a three-dimensional point cloud;
generating a plurality of three-dimensional slices, each associated with a two-dimensional reference plane; and
accumulating points normal to the two-dimensional reference plane into pixels of brightness proportional to the number of points accumulated, the pixel brightness indicating terrain of substantially equal elevation.

20. A computer-based system for generating a three-dimensional grid of terrain, comprising:
a receiving module for receiving data representing a three-dimensional point cloud;
a slice generating module for generating a plurality of slices of the data;
a swarm intelligence module for evaluating the slices using a swarm intelligence algorithm;
a terrain identifying module for identifying terrain as a function of the evaluation; and
a three-dimensional grid generating module for generating a three-dimensional grid of the identified terrain.

* * * * *